US009244755B2

(12) United States Patent
Huang et al.

(10) Patent No.: US 9,244,755 B2
(45) Date of Patent: Jan. 26, 2016

(54) SCALABLE LOG ANALYTICS

(71) Applicant: VMware, Inc., Palo Alto, CA (US)

(72) Inventors: Mark Huang, Seattle, WA (US); Junyuan Lin, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 161 days.

(21) Appl. No.: 13/897,994

(22) Filed: May 20, 2013

(65) Prior Publication Data

US 2014/0344622 A1 Nov. 20, 2014

(51) Int. Cl.
*G06F 11/00* (2006.01)
*G06F 11/07* (2006.01)

(52) U.S. Cl.
CPC .......... *G06F 11/0775* (2013.01); *G06F 11/079* (2013.01); *G06F 11/0769* (2013.01)

(58) Field of Classification Search
CPC ......... G06F 7/08; G06F 7/20; G06F 11/0712; G06F 11/0766; G06F 11/0769; G06F 11/0775; G06F 11/0781; G06F 11/0787; G06F 11/1471; G06F 11/2268
See application file for complete search history.

(56) References Cited

U.S. PATENT DOCUMENTS

| 7,778,419 | B2 * | 8/2010 | Gebotys ........................ 380/205 |
| 7,925,678 | B2 * | 4/2011 | Botros et al. .................. 707/803 |
| 8,073,806 | B2 * | 12/2011 | Garg et al. ...................... 706/62 |
| 2005/0223027 | A1 * | 10/2005 | Lawrence et al. .......... 707/103 R |
| 2009/0113246 | A1 * | 4/2009 | Sabato et al. .................... 714/37 |
| 2011/0119219 | A1 * | 5/2011 | Naifeh et al. .................... 706/47 |
| 2011/0131453 | A1 * | 6/2011 | Fernandess et al. ............. 714/37 |
| 2011/0185234 | A1 * | 7/2011 | Cohen et al. ..................... 714/37 |
| 2011/0296244 | A1 * | 12/2011 | Fu et al. .......................... 714/37 |

OTHER PUBLICATIONS

Yang et al.; "Near-Duplicate Detection by Instance-level Constrained Clustering;" SIGIR '06; Aug. 2006; pp. 421-428.*
LV, et al., "Ferret: A Toolkit for Content-Based Similarity", In Proceedings of the 1st ACM SIGOPS/EuroSys European Conference on Computer Systems, Leuven, Belgium, Apr. 2006, 14 pages.
Bitincka, et al., "Optimizing Data Analysis with a Semi-structured Time Series Database", In Workshop on Managing Systems via Log Analysis and Machine Learning Techniques (SLAML '10), Vancouver, BC, Canada, Oct. 2010, 9 pages.
Shilane, et al., "WAN Optimized Replication of Backup Datasets Using Streaminformed Delta Compression", In Proceedings of the 10th USENIX Conference on File and Storage Technologies, San Jose, CA Feb. 2012, 15 pages.

\* cited by examiner

*Primary Examiner* — Joseph Kudirka

(57) ABSTRACT

Large amounts of unstructured log data generated by software and infrastructure components of a computing system are processed and analyzed in real time to identify anomalies and potential problems within the computing system. A log analytics module reduces both the volume and level of detail of log data by first classifying log messages into message types based on their content similarity. The log analytics module may then further reduce data by grouping bursts of log messages into log events. Patterns within these log events, such as the collection and number of different message types that comprise the event, can be used to identify anomalous events.

20 Claims, 4 Drawing Sheets

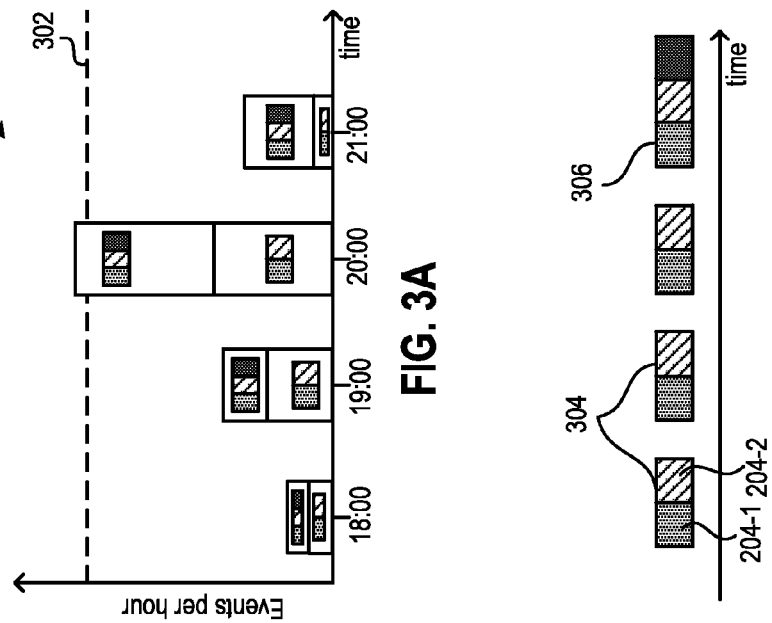
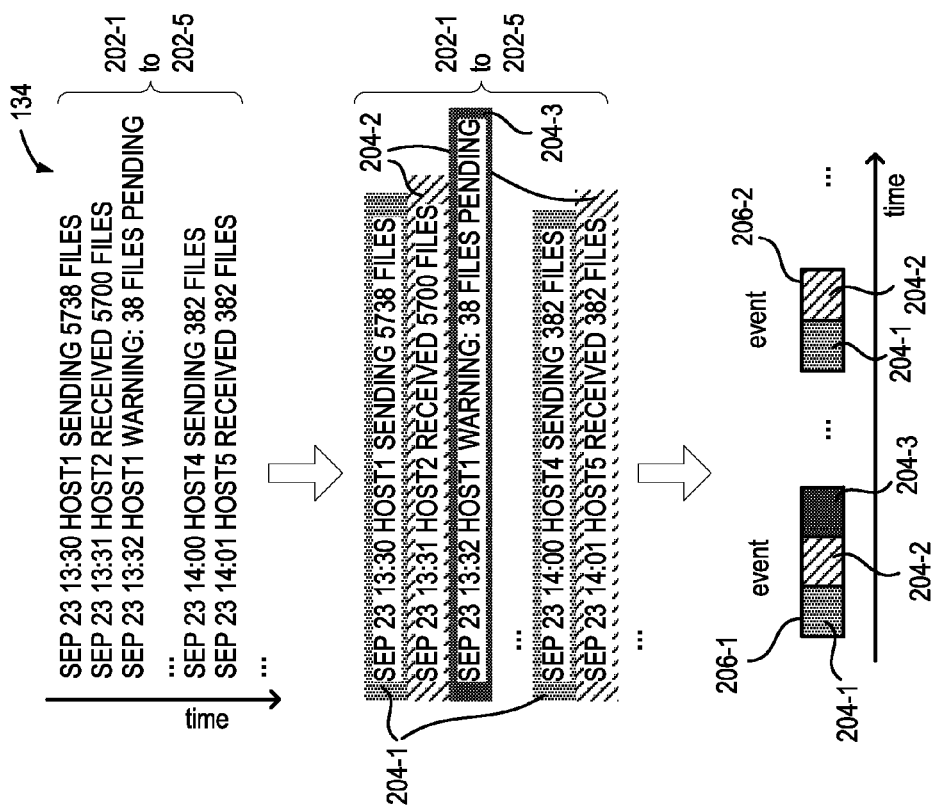
FIG. 3A
FIG. 3B
FIG. 2

SCALABLE LOG ANALYTICS

BACKGROUND

System administrators provide virtualized computing infrastructure, which typically includes a plurality of virtual machines executing on a shared set of physical hardware components, to offer highly available, fault-tolerant distributed systems. However, a large-scale virtualized infrastructure may have many (e.g., thousands) of virtual machines running on many of physical machines. High availability requirements provide system administrators with little time to diagnose or bring down parts of infrastructure for maintenance. Fault-tolerant features ensure the virtualized computing infrastructure continues to operate when problems arise, but generates many intermediate states that have to be reconciled and addressed. As such, identifying, debugging, and resolving failures and performance issues for virtualized computing environments have become increasingly challenging.

Many software and hardware components generate log data to facilitate technical support and troubleshooting. However, over an entire virtualized computing infrastructure, massive amounts of unstructured log data can be generated continuously by every component of the virtualized computing infrastructure. As such, finding information within the log data that identifies problems of virtualized computing infrastructure is difficult, due to the overwhelming volume of unstructured log data to be analyzed.

SUMMARY

One or more embodiments disclosed herein provide a method for providing real-time analysis of log messages for a computer infrastructure. The method includes receiving a plurality of log messages including a first log message, and generating a sketch associated with the first log message. The sketch may be generated based on words contained in the first log message. The method further includes determining a message type for the first log message based on a comparison of the generated sketch to a plurality of sketches stored in an index. Log messages of a same message type have similar sketches. The method includes determining a first log event associated with one or more log messages occurring with a first time interval, wherein the first log event comprises a first composition of message types corresponding to the associated log messages. The method further includes determining an event type for the first log event based on a comparison of the first composition of message types to a plurality of compositions of message types stored in the index, and determining an anomalous log event within the plurality of log messages based on the classification for the first log event.

Further embodiments of the present disclosure include a non-transitory computer-readable storage medium that includes instructions that enable a processing unit to implement one or more of the methods set forth above or the functions of the computer system set forth above.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

FIG. 2 is a block diagram that illustrates a workflow for analyzing log data of the computing system, according to one embodiment of the present disclosure.

FIGS. 3A-3B are block diagrams that depict examples of event pattern and event volume anomalies, according to one embodiment of the present disclosure.

DETAILED DESCRIPTION

One or more embodiments disclosed herein provide methods, systems, and computer programs for analyzing log data for a computing infrastructure in real-time. In one embodiment, log data, sometimes referred to as runtime logs, error logs, debugging logs, is reduced in both volume and level of detail by first classifying messages into types by content similarity. The log data is then reduced further by grouping bursts of messages into log events. Patterns in log events, such as the collection and number of different messages types that comprise each log event, can be used to identify anomalous events within the log data. For example, patterns in the log events may be used to detect when log events occur that differ in message type composition, or when log events occur that differ in frequency of occurrence over time.

Figure 1A:
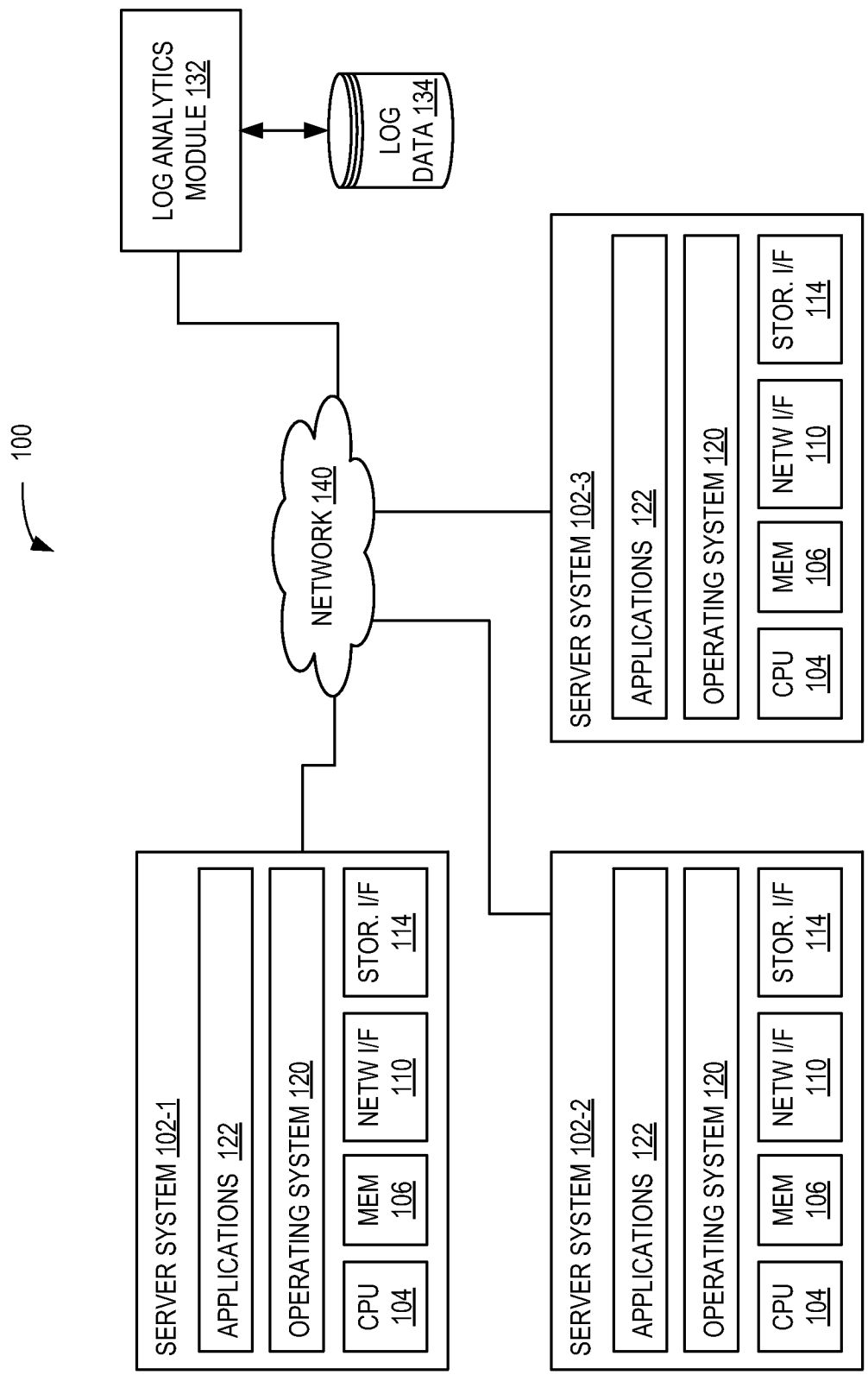
FIG. 1A depicts a block diagram that illustrates a computing system with which one or more embodiments of the present disclosure may be utilized.

FIG. 1A is a block diagram that illustrates a computing system 100 with which one or more embodiments of the present invention may be utilized. As illustrated, computing system 100 includes a plurality of server systems, identified as server system 102-1, 102-2, 102-3, and referred to collectively as servers 102. Each server 102 includes CPU 104, memory 106, networking interface 110, storage interface 114, and other conventional components of a computing device. Each server 102 further includes an operating system 120 configured to manage execution of one or more applications 122 using the computing resources (e.g., CPU 104, memory 106, networking interface 110, storage interface 114).

As mentioned earlier, software and infrastructure components of computing system 100 including servers 102, operating systems 120, and applications 122 running on top of operating system 120, may generate log data during operation. Log data may indicate the state, and state transitions, that occur during operation, and may record occurrences of failures, as well as unexpected and undesirable events. In one embodiment, log data may be unstructured text comprised of a plurality of log messages, including status updates, error messages, stack traces, and debugging messages. With thousands to millions of different processes running in a complex computing environment, an overwhelming large volume of heterogeneous log data, having varying syntax, structure, and even language, may be generated. As such, finding log messages relevant to the context of a particular issue, as well as proactively identifying emerging issues from log data, can be challenging.

Accordingly, embodiments of the present disclosure provide a log analytics module 132 configured to store and analyze in real-time log data 134 from software and infrastructure components of computing system 100. Log analytics module 132 may include a log index 136 configured to cache (and later query) results of the analysis of log data. Log analytics module 132 reduces the volume and level of details of the log data to enable a user (e.g., system administrator) to diagnose and troubleshoot issues within computing system 100.

In one embodiment, log analytics module 132 is configured to parse a stream of log messages within log data and identify groups of log messages as logical events, referred to interchangeably as "log events" or "events". To do so, log analytics module 132 is configured to classify log messages within a stream of log data as log message types that cluster together similar log messages. Log analytics module 132 is further configured to perform event detection on log messages within log data to group together log messages based on their occurrence close in time in a sequence. As described later, in one embodiment, events may be defined as a collection of log message types, and an occurrence of an event corresponds to a group of log messages having the requisite log message types appearing in log data. Log analytics module 132 may further identify anomalies within log data based on the message-type classifications and detected events, such as event volume anomalies and event pattern anomalies.

Through analysis techniques described herein, log analytics module 132 indicates to a user what one event (as reported by log messages) means in relation to other events in the log data and highlights events occurring within computing system 100 in context. In some embodiments, log analytics module 132 may highlight certain events in the context of being nearby in time to other events, such that if the certain events usually occur in a sequence, then events occurring out of that sequence may be notable. In some embodiments, log analytics module 132 may highlight certain events in the context of being similar to other events, such that similar events may be clustered and analyzed together rather than be considered separately. In some embodiments, log analytics module 132 may highlight certain events in the context of the hierarchical infrastructure of computing system 100, such as being from the same thread, process, application, virtual machine, host, host group, data center, etc. The operations of log analytics module 132 are illustrated in greater detail in conjunction with FIG. 2.

Figure 1B:
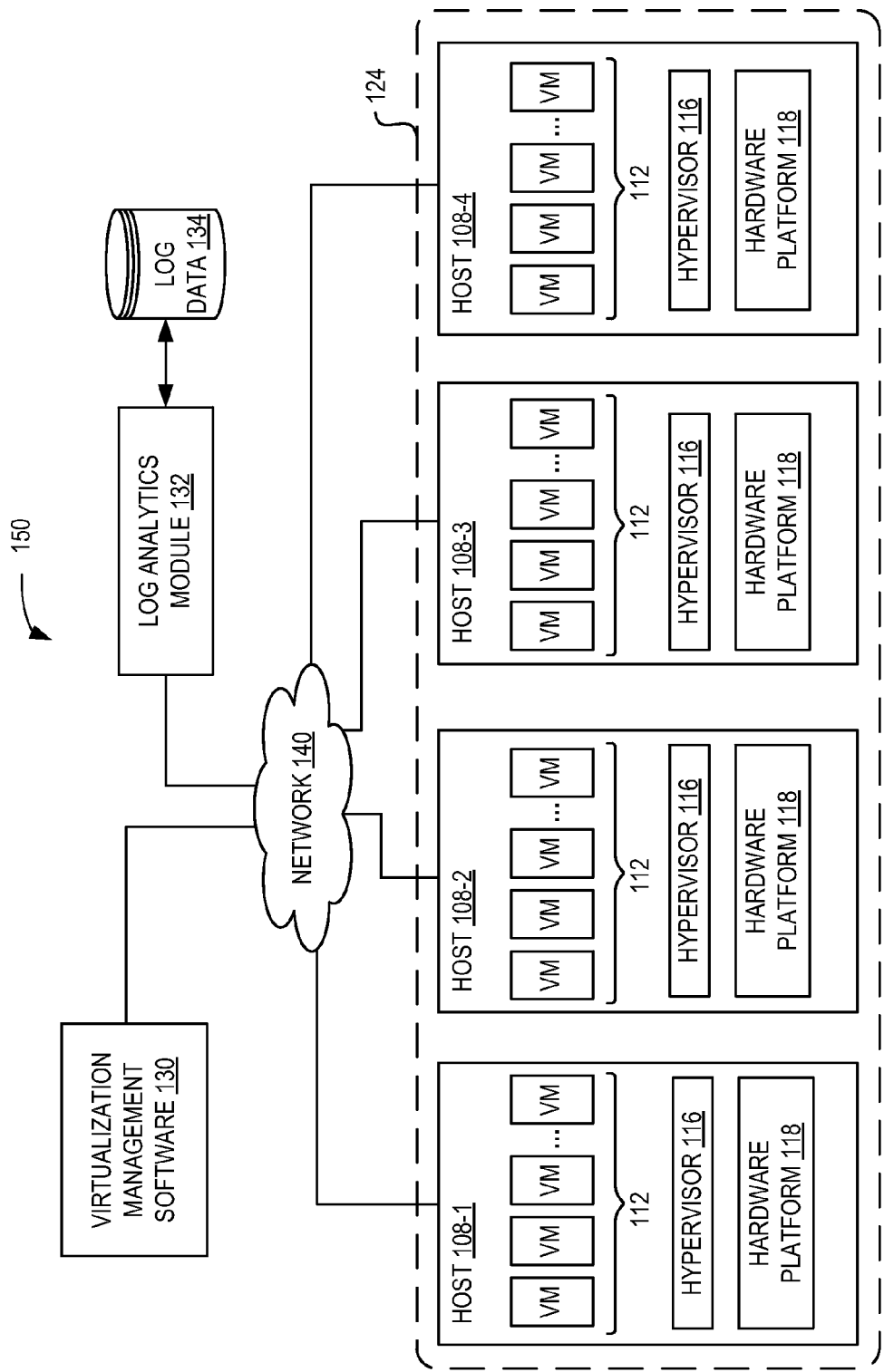
FIG. 1B is a block diagram that illustrates a virtualized computing system with which one or more embodiments of the present disclosure may be utilized.

While embodiments of the present invention are described in conjunction with a computing environment having physical components, it should be recognized that log data 134 may be generated by components of other alternative computing architectures, including a virtualized computing system as shown in FIG. 1B. FIG. 1B is a block diagram that illustrates a computing system 150 with which one or more embodiments of the present disclosure may be utilized. As illustrated, computing system 150 includes a host group 124 of host computers, identified as hosts 108-1, 108-2, 108-3, and 108-4, and referred to collectively as hosts 108. Each host 108 is configured to provide a virtualization layer that abstracts computing resources of a hardware platform 118 into multiple virtual machines (VMs) 112 that run concurrently on the same host 108. Hardware platform 118 of each host 108 may include conventional components of a computing device, such as a memory, processor, local storage, disk interface, and network interface. The VMs 112 run on top of a software interface layer, referred to herein as a hypervisor 116, that enables sharing of the hardware resources of host 108 by the virtual machines. One example of hypervisor 116 that may be used in an embodiment described herein is a VMware ESXi hypervisor provided as part of the VMware vSphere solution made commercially available from VMware, Inc. Hypervisor 116 may run on top of the operating system of host 108 or directly on hardware components of host 108. Each VM 112 includes a guest operating system (e.g., Microsoft Windows, Linux) and one or more guest applications and processes running on top of the guest operating system.

In the embodiment shown in FIG. 1B, computing system 150 includes virtualization management software 130 that may communicate with the plurality of hosts 108 via network 140. Virtualization management software 130 is configured to carry out administrative tasks for the computing system 100, including managing hosts 108, managing VMs running within each host 108, provisioning VMs, migrating VMs from one host to another host, and load balancing between hosts 108 of host group 124. In one embodiment, virtualization management software 130 is a computer program that resides and executes in a central server, which may reside in computing system 100, or alternatively, running as a VM in one of hosts 108. One example of a virtualization management software is the vCenter® Server product made available from VMware, Inc. Similar to the software and infrastructure components of computing system 100, the software and infrastructure components of computing system 100, including, host group(s) 124, hosts 108, VMs 112 running on hosts 108, guest operating systems, applications, and processes running within VMs, may generate large amount of log data in real-time during operation.

While log analytics module 132 is depicted in FIG. 1B as a separate component that resides and executes on a separate server or virtual machine, it is appreciated that log analytics module 132 may alternatively reside in any one of the computing devices of the virtualized computing system 150, for example, such as the same central server where the virtualization management software 130 resides. In one embodiment, log analytics module 132 may be embodied as a plug-in component configured to extend functionality of virtualization management software 130. Access to the log analytics module 132 can be achieved via a client application (not shown). For example, each analysis task, such as searching for log messages, filtering for log messages, analyzing log messages over a period of time, can be accomplished through the client application. One embodiment provides a stand-alone application version of the client application. In another embodiment, the client application is implemented as a web browser application that provides management access from any networked device.

FIG. 2 is a block diagram that illustrates a workflow for analyzing log data 134 of a computing infrastructure, according to one embodiment of the present disclosure. It should be recognized that, even though the workflow is described in conjunction with the system of FIG. 1A, any system configured to perform the illustrated technique is within the scope of embodiments of the disclosure. In the embodiment shown, log data 134 may include a plurality of individual log messages 202-1 to 202-5 (collectively referred to as log messages 202) generated over a period of time. In some embodiments, a log message may include a time stamp (e.g., "Sep 23 13:30") indicating a date and time corresponding to the creation of the log message and a text description (e.g., "host1 sending 5738 files"). While each log message 202 is depicted as a separate line of text for sake of illustration, it should be recognized that log messages 202 may be arranged in a variety of formats, including log messages that span several lines.

In one embodiment, log analytics module 132 may classify each log message 202 as a message type based on content similarity of the log messages. In some embodiments, the content similarity is performed on the text description portion of the log message 202. In the example shown in FIG. 2, log analytics module 132 processes log message 202-1 (i.e., "Sep 23 13:30 host1 sending 5738 files") and assigns log message 202-1 a first message type 204-1. Log analytics module 132 then processes a second log message 202-2 (i.e., "Sep 23 13:31 host2 received 5700 files") and determines the contents of second log message 202-2 are not sufficiently similar to first log message 202-1 and assigns a different, second message type 204-2. Similarly, log analytics module 132 processes a third log message 202-3 (i.e., "Sep 23 13:32 host1 warning: 38 files pending") and assigns a third message type 204-3 upon determining no content similarity with the other already processed log messages. For sake of illustration, log messages having different message types are depicted in FIG. 2 as shapes having different patterns. In one embodiment, log analytics module 132 may determine content similarity of log messages according to a "sketching" algorithm that determines if log messages contain a number of words in common in the same relative position. Determination of content similarity and the sketching algorithm are described in greater detail below.

Continuing the example shown in FIG. 2, log analytics module 132 processes a fourth log message 202-4 (i.e., "Sep 23 14:00 host4 sending 382 files") and determines content similarity with log message 202-1. As such, log analytics module 132 assigns log message 202-4 the same first message type 204-1 as log message 202-1, as depicted in FIG. 2 by identical patterned highlights or colors. Similarly, log analytics module 132 processes a fifth log message 202-5 (i.e., "Sep 23 14:01 host5 received 382 files") and assigns the second message type 204-2 based on a determination of content similarity with log message 202-2.

In one embodiment, log analytics module 132 is configured to identify one or more log events 206 based on the timing of the log messages. In some embodiments, log analytics module 132 may group one or more log messages 202 into log events 206 according to a burst analysis algorithm. For example, log analytics module 132 identifies a first log event 206-1 that includes log messages 202-1, 202-2, 202-3, which all occur approximately the same time at September 23, 13:30 and a second log event 206-2 that includes log messages 202-4, 202-5 that all occur around September 23 14:00. In one embodiment, log analytics module 132 is configured to represent each identified log event 206 as a composition of message types of log messages. In some embodiments, an event type for a log event may be defined as a composition of tuples of message type and frequency. In the example shown in FIG. 2, a first event 206-1 may be characterized as a composition of one occurrence of message type 204-1 (e.g., "Sending . . . files"), one occurrence of message type 204-2 (e.g., "Received . . . files"), and one occurrence of message type 204-3 (e.g., "Warning . . . files pending"); and second event 206-2 may be characterized as a composition of one occurrence of message type 204-1 (e.g., "Sending . . . files") and one occurrence of message type 204-2 (e.g., "Received . . . files").

According to one embodiment, log analytics module 132 may identify anomalous events based on patterns of events from log data 134, as shown in FIGS. 3A and 3B. FIG. 3A is a chart 300 depicting an example of an event volume anomaly based on frequency of occurrence of events over time. Log analytics module 132 may determine the number of events occurring per hour in a given time period, e.g., from 6:00 PM to 9:00 PM. Chart 300 further illustrates a breakdown of event types for each hour, depicting occurrences of events similar to log events 206-1 and 206-2. As an example, it may be normal within the computing system for approximately 20 events per hour to occur. But, a sudden increase of events to 200 events per hour (e.g., at 19:00) and then to 500 events per hour (e.g., at 20:00), thereby exceeding some threshold value 302, can trigger log analytics module 132 to flag this as an anomalous occurrence of event volume.

FIG. 3B depicts an example of an event pattern anomaly based on events that are different in message type composition. As shown, events 304 occurring at a given time are usually an event type similar to event 206-1 (i.e., events comprised of "Sending . . . files" log messages and "Received . . . files" log messages). However, an unexpected or atypical event 306 may occur, such as event 306, which is an event comprised of "Sending . . . files" log messages, "Received . . . files" log messages, and "Warning . . . files pending" log messages, which is different from the usual events. In this case, log analytics 132 may determine an anomalous occurrence of a log event 306 (i.e., composed of message types 204-1, 204-2, and 204-3), that is different in composition from other log events (i.e., composed of message types 204-1 and 204-2).

Figure 4:
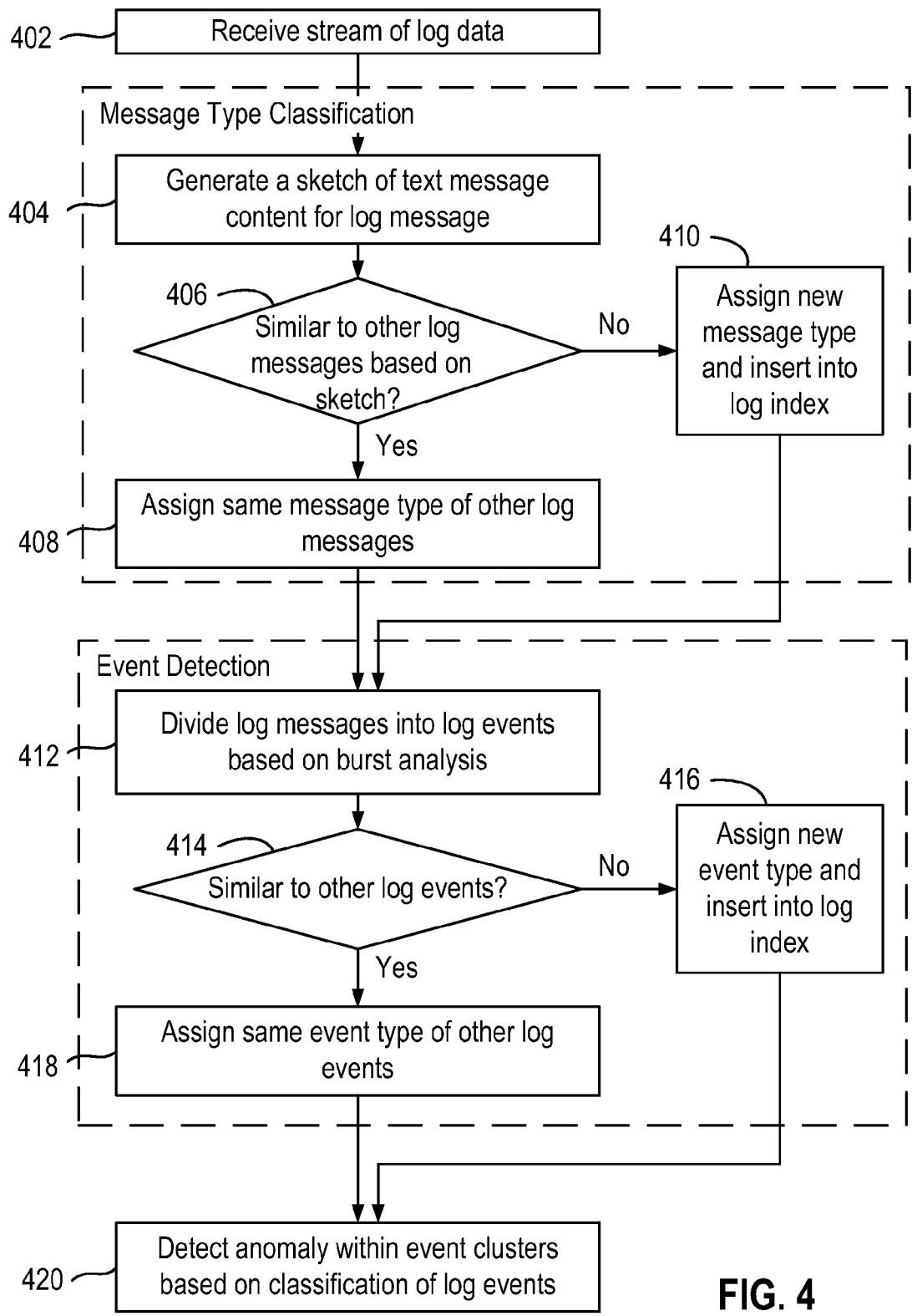
FIG. 4 is a flow diagram that illustrates steps for a method for analyzing log data of a computing system, according to an embodiment of the present disclosure.

FIG. 4 is a flow diagram that illustrates steps for a method 400 for providing real-time analysis of log messages for a computer infrastructure, according to an embodiment of the present disclosure. It should be recognized that, even though the method 400 is described in conjunction with the system of FIG. 1, any system configured to perform the method steps is within the scope of embodiments of the disclosure.

The method 400 begins at step 402, where log analytics module 132 receives a stream of log data 134 generated by software and infrastructure components of computing system 100. As described above, log data 134 may include a plurality of log messages. In some embodiments, log analytics module 132 may be configured to retrieve log data (e.g., log files) from software and infrastructure components of computing system 100, including applications 122, operation systems 120, and in the case of virtualized computing system 150, components such as hypervisors 116, guest application and operating systems running within VMs 112. In other embodiments, software and infrastructure components of computing system 100 may be configured to write log files to a common destination, such as an external storage, from which log analytics module 132 may periodically retrieve log data. In some embodiments, log data 134 may be transferred over network 140 directly to log analytics module 132.

At step 404, log analytics module 132 generates a compact integer representation, or "sketch," of text content for a log message in the received log data. In one embodiment, a sketch associated with a log message is generated based on words of the log message. As mentioned above, two log messages may be considered similar if the log messages contain a number of words in common in the same relative positions. As such, sketches of log messages are computed such that similar log messages should have identical or substantially similar sketches. In one embodiment, a sketch of a log message may be an ordered list, or tuple, of fingerprint values corresponding to a subset of the words of the log message.

In some embodiments, a sketch of a log message is tuple of fingerprints of "interesting" words of the log message. Each interesting word of the log message (e.g., "host1") can be given a value (e.g., 753) using a fingerprint function, such as a hash function. For example, a sketch generated for a log message "host1 sending 5738 files" may be a tuple of fingerprint values (753, 1034, 886) that corresponds to interesting words (host1, Sending, files). In another example, a sketch for the log message "host4 Sending 382 files" can be computed as the tuple (1965, 1034, 886) that corresponds to interesting features (host4, Sending, files). As such, because the sketches (753, 1034, 886) and (1965, 1034, 886) have identical values "1034" and "886" in same relative positions, the two log messages may be deemed similar.

In one implementation, sketches of log messages may be generated according to a sketching algorithm that uses N independent scoring functions to pick N "interesting" words of a log message, where "interesting" is determined according to each scoring function. In some embodiments, a scoring function is a hash function that computes a 32-bit integer given a word. In such a scheme, a sketch may be composed of 32-bit fingerprints of the most interesting words in a log message, where "most interesting" is determined by N scoring functions (e.g., N=8):

$$Score_1(\text{Word}) = (M_1 * Fingerprint(\text{Word}) + A_1) \bmod 2^{32}$$

$$Score_2(\text{Word}) = (M_2 * Fingerprint(\text{Word}) + A_2) \bmod 2^{32}$$

$$\ldots$$

$$Score_N(\text{Word}) = (M_N * Fingerprint(\text{Word}) + A_N) \bmod 2^{32}$$

The parameters $M_N$ and $A_N$ for each scoring function may be selected such that the scoring functions are linearly independent (i.e., $\Sigma_{i=0}^{N}(C_i * Score_i(\text{word})) = 0$ only if $C_i$ are zeros) and the different scores for a particular word are uncorrelated. Log analytics module 132, for each scoring function, scores each word in the log message and selects the word having with the highest score (i.e., "most interesting"), according to that scoring function. As each scoring function selects one word in the log message, N scoring functions results in N words being selected. The fingerprints of these N words are then combined to form a sketch of the log message.

For example, the log message "host1 sending 7182 files using SFTP protocol" may scored in the following manner by N=4 scoring functions, where the most interesting word for each scoring function is emphasized:

Score$_1$: <u>host1</u> sending 7182 files using SFTP protocol
Score$_2$: host1 <u>sending</u> 7182 files using SFTP protocol
Score$_3$: host1 sending 7182 <u>files</u> using SFTP protocol
Score$_4$: host1 <u>sending</u> 7182 files using SFTP protocol In this example, the four scoring functions determined that the most interesting words were "host1", "sending," "files," and "sending" (again). The word "host1" had the highest score of the 6 words in the log message according to the first scoring function Score'. The word "sending" had the highest score of the 6 words according to both the second and fourth scoring function, and the word "files" was the highest scoring word of the word in the log message according to the third scoring function. As such, the resulting sketch would be a 4-tuple of the fingerprints of these words as follows. For clarity, simple numerical values (e.g., 753) are shown for the fingerprint values, but it should be recognized that fingerprint values may be 32-bit values (e.g., 0x459c8cbb).

Fingerprint("host1")=753
Fingerprint("sending")=1034
Fingerprint("files")=886
Fingerprint("sending")=1034
Sketch$_1$=(753, 1034, 886, 1034))

Continuing this example, if a similar but slightly different log message (i.e., "host4 sending 208 files using SFTP protocol") is received and processed, the four scoring functions may score the slightly different log message similarly:

Score$_1$: <u>host4</u> sending 208 files using SFTP protocol
Score$_2$: host4 <u>sending</u> 208 files using SFTP protocol
Score$_3$: host4 sending 208 <u>files</u> using SFTP protocol
Score$_4$: host4 <u>sending</u> 208 using SFTP protocol As shown, a change in the score of first word "host4" did not affect the selection of the highest scoring word for three out of the four scoring functions. It has been determined that if a majority of N independent scoring functions select the same words in two different log messages, the log messages are very likely to be similar overall. For example, in this case, the resulting sketch would be a 4-tuple of the fingerprints of these words:

Fingerprint("host4")=1965
Fingerprint("sending")=1034
Fingerprint("files")=886
Fingerprint("sending")=1034
Sketch$_2$=(1965, 1034, 886, 1034)

Comparing the sketches for the two log messages:
Sketch$_1$~Sketch$_2$
(753, 1034, 886, 1034)~(1965, 1034, 886, 1034)
reveals three out of four fingerprint values in common (i.e., "1034", "886", and "1034"). As such, a majority of the scoring functions have selected the same words "sending", "files", and "sending" in both log messages, and therefore the two log messages may be deemed similar.

While other approaches for selecting words in a log message may be used, such as choosing the first few words of a log message or selecting even-numbered words, or other content-insensitive schemes, the sketching algorithm as described herein is advantageously more robust to relative insertions or deletions of text. It has been determined that the insertion or deletion of an additional word relative to the original text is unlikely to change all or even a majority of the words selected by each scoring function. In one embodiment, a linear congruential generator (LCG) may be used as a scoring function, though it should be recognized that other types of scoring functions can be used, including functions that are deterministic and produce uncorrelated results.

Log analytics module 132 then determines a message type classification for the log message based on the corresponding sketch for the log message. Log analytics module 132 classifies log messages having similar sketches to have the same message type. Such clustering helps reduce the number of log messages that need to be examiner by grouping the messages into a few number of message types that can then be highlighted. Accordingly, message type classification enable log analytics module to cluster together similar log messages to more effectively process and analyze a large volume of log data.

At step 406, log analytics module 132 queries log index 136 to determine whether the log message is similar to a previously processed log message based on the corresponding sketches, and if so, assigns the log message a same message type as the previously processed log message, at step 408. For example, log analytics module 132 queries log index 136 using the sketch (1965, 1034, 886, 1034) corresponding to the log message "host4 sending 208 files using SFTP protocol" and determines the log messages is similar to the previously processed log message "host1 sending 7182 files using SFTP protocol" based on the similarity with its corresponding sketch (753, 1034, 886, 1034). As discussed earlier, in some embodiments, two log messages may be deemed similar and assigned a same message type if a majority of the scoring functions have selected the same words in both log messages. Otherwise, at step 410, log analytics module 132 assigns a new message type to the log message and inserts the log message into log index 136.

In one embodiment, each message type may be represented by a message type identifier, or "cluster ID." For example, the log messages depicted in FIG. 2 may have the following sketches and corresponding cluster IDs (the sketches are shown as tuples of the most interesting words rather than the fingerprint values for clarity of illustration):

(host1, sending, files, sending) = 22280

(host2, received, files, files) = 22281

(host1, warning, files, pending) = 22282

...

(host4, sending, files, sending) = 22280

In this example, the sketch (host1, sending, files, sending) is given the same cluster ID 22280 as the sketch (host4, sending, files, sending), because of matching 3 out of 4 fingerprint values. In some embodiments, log analytics module 132 may provide the ability to search the received log messages based on a given cluster ID. In some embodiments, log analytics module 132 may use cluster ID as a search criteria for log messages that are similar to a particular log message (i.e., "find log messages "like this"") by querying for log messages having a particular cluster ID. In some embodiments, log analytics module 132 may use the cluster ID as a criteria for aggregation to generate statistics, such as the Top-5 message types per hour. In some embodiments, cluster ID may be content-based and enable calculation of message type classifications to be distributed.

According to one implementation, log index 136 may include one or more hash tables that map fingerprint values to sketches for a given log message. In some embodiments, log index 136 may include N hash tables for mapping fingerprint values to sketches that contain N fingerprint values. To determine whether a log message is similar to other log messages, each fingerprint value in the sketch (i.e., each column in the tuple <1965, 1034, 886, 1034>) may be used to search for candidate sketches. In one particular embodiment, a candidate sketch must match in M different columns to be considered a match, where M is less than N. As an example, where N=8, each of the 8 fingerprints in a sketch is looked up in its corresponding hash table to find candidate sketches with at least 6 matching fingerprints (M=60). If at least one candidate is found, the incoming log message belongs to that cluster and is assigned a same message type, and the sketch is not inserted into the log index. If no candidate are found, a new cluster is generated having a new message type, and the sketch is inserted into log index 136.

In some embodiments, log analytics module 132 may store a representation of each message type within log index 136 by storing a copy of a full log message. Log analytics module 132 may use a textual differential algorithm (e.g., longest substring match) or other additional textual analysis to verify similarity of the incoming log message to a representative of the message type and override message type classification based on poor sketches. In some embodiments, the stored representation of each message type may be used to provide an example log message that is displayed to a user (e.g., system administrator) when presenting the statistics or graphical charts for the message type.

At step 412, log analytics module 132 divides one or more log messages into log events based on burst analysis. It has been determined that log messages corresponding to events within computer system 100 may be created in bursts and close-in-time. For example, a burst of log messages may be recorded by applications and guest operating system whenever a virtual machine shuts down or restarts. In one embodiment, log analytics module 132 processes time stamps of log messages 202 and tracks time between log messages. In some embodiments, log analytics module 132 may determine and maintain an average time interval associated with an event duration. For example, log messages occurring within a 10-second duration may be candidates for being grouped together as a single log event. Log analytics module 132 may associate one or more log messages occurring within the event duration to a log event 206. Log analytics module 132 may represent each log event as a composition of different message types, such as a list of tuples of a message type and corresponding frequency of occurrence. For example, one log event may be comprised of log messages having an occurrence of a "sending files" message type, two occurrences of a "received files" message type, and one occurrence of a "warning files pending" message type, and may be represented by a list of pairs having cluster ID and frequency: (22280, 1), (22281, 2), (22282, 1).

Log analytics module 132 may then cluster together similar log events, applying a technique similar to the technique applied above for clustering similar log messages. At step 414, log analytics module 132 queries log index 136 to determine whether a log event is similar to other log events based on the composition of message types that comprise the log event, and if so, assigns a same event type as the previously determined log events, at step 418. Otherwise, at step 416, log analytics module 132 assigns a new event type to the log event, and may insert the composition of the new event type into log index 136.

In one implementation, log index 136 may further include additional hash tables that map cluster IDs to compositions of event types for a given log event. As such, to determine whether a log event is similar to other log events, each cluster ID may be used as a hash table lookup for candidate compositions that have some or all matching cluster IDs. In some embodiments, the event type of a log event is determined by performing lookups in the hash tables according to each pair of message type identifier and a corresponding frequency of occurrence. If at least one candidate event type is found, the detected log event may be determined similar to the corresponding log event and may be assigned the same event type. If no candidate is found, a new event cluster is generated having a new event type, and the representative composition of message types is inserted into log index 136.

At step 420, log analytics module 132 analyzes event clusters and detects an anomaly within event clusters based on the classification of log events. In some embodiments, log analytics module 132 may determine an occurrence of an "incomplete" event or a gross deviation from an expected event. For example, where an expected log event may be a composition of message types (22280, 2), (22281, 2), (22282, 3), (22283, 1), (22284, 1), an incomplete log event may be detected upon determining an occurrence of a log event only having (22280, 2), (22281, 2), (22282, 3), (22283, 1) In another example, a deviation from a known log event may be detected upon determining an occurrence of a log event having (22280, 2), (22281, 2), (22282, 3), (22283, 1), (22284, 1), (34921, 292), (34927, 395).

In some embodiments, log analytics module 132 may determine an anomaly in event volume based on one or more threshold values. As described earlier in conjunction with FIG. 3A, log analytics module 132 may detect when a number of events occurring per unit of time exceeds or falls below a threshold value. For example, log analytics module 132 may determine an occurrence of an anomaly in event volume when the number of events occurring per hour exceeds 500 events per hour (suggesting over-activity), or falls below 5 events per hour (suggesting inactivity). In some embodiments, a threshold value may be associated with a particular event type, such that occurrences of that particular event type that exceeds the threshold value may be flagged as an anomaly. The threshold values may be pre-determined, as well as configurable by a user. In some embodiments, the threshold values may be dynamically determined based on the performance history of the computing system, for example, using a weighted moving average, or other suitable heuristics. The threshold values may be specified in a variety of manners, including absolute numerical values (e.g., 500 events/hr), and relative values, such as percentages (e.g., 200% change). In some embodiments, log analytics module 132 may present the detected anomaly, as well as the classified message types and event types, to a user via a graphical user interface. For example, the graphical user interface may provide charts, graphics, and statistical displays to illustrate a most frequent event over a past week, or an anomalous event occurring in a last 1-hour period. In one embodiment, log analytics module 132 may use frequency of log events and anomaly detection to generate an alert for an operator (e.g., system administrator) that the frequency of a particular log message type has increased or decreased in an anomalous way.

Accordingly, embodiments of the present disclosure provide a technique for processing log data that enables real-time analysis that is scalable for the multitude of log data generated by many software and infrastructure components of a computer system 100. In contrast to conventional approaches, embodiments described herein advantageously reduces the need for multiple passes over the same dataset or the need for active intervention in the form of feedback and training to properly analyze data. Embodiments of the present disclosure provide a system for unsupervised, approximate clustering of log data that provides volume- and pattern-based anomaly detection.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for providing real-time analysis of log messages for a computer infrastructure, the method comprising:
   receiving a plurality of log messages including a first log message;
   generating a sketch associated with the first log message, wherein the the sketch includes a tuple of fingerprint values generated by processing a subset of words of the first log message through a fingerprint function;
   determining a message type for the first log message based on a comparison of the generated sketch to a plurality of sketches stored in an index, wherein log messages of a same message type have similar sketches;
   determining a first log event associated with one or more of the plurality of log messages occurring with a time interval, wherein the first log event comprises a first composition of message types corresponding to the one or more of the plurality of log messages associated with the first log event;
   determining an event type for the first log event based on a comparison of the first composition of message types to a plurality of compositions of message types stored in the index; and
   determining an anomalous log event within the plurality of log messages based on the event type for the first log event.

2. The method of claim 1, wherein the fingerprint function comprises a hash function and the fingerprint values comprise integers generated by the hash function.

3. The method of claim 1, wherein log events of a same event type have similar compositions of message types.

4. The method of claim 1, wherein the determining the event type for the first log event comprises:
upon determining the first composition of message types is similar to at least one of the plurality of compositions of message types, assigning the event type to be a same event type corresponding to the similar composition of message types.

5. The method of claim 1, wherein the determining the event type of the first log event comprises:
upon determining the first composition of message types is not similar to any of the plurality of compositions of message types, assigning a new event type for the first log event and inserting the first composition of message types into the index.

6. The method of claim 1, wherein the first composition of message types for the first log event comprises a list of pairs of a message type identifier and corresponding frequency of occurrence.

7. The method of claim 6,
wherein the index comprises a plurality of hash tables configured to map compositions of message types to event types; and
wherein the determining the event type of the first log event comprises performing lookups in the plurality of hash tables according to each pair of message type identifier and corresponding frequency of occurrence.

8. The method of claim 1, wherein the determining the anomalous log event within the plurality of log messages further comprises:
determining the anomalous log event that differs in composition of message types based on the event type for the first log event.

9. The method of claim 1, wherein the determining the anomalous log event within the plurality of log messages further comprises:
determining the anomalous log event based on the event type for the first log event and further based on frequency of occurrence over time.

10. A non-transitory computer-readable storage medium comprising instructions that, when executed in a computing device, provide real-time analysis of log messages for a computer infrastructure, by performing the steps of:
receiving a plurality of log messages including a first log message;
generating a sketch associated with the first log message, wherein the sketch includes a tuple of fingerprint values generated by processing a subset of words of the first log message through a fingerprint function;
determining a message type for the first log message based on a comparison of the generated sketch to a plurality of sketches stored in an index, wherein log messages of a same message type have similar sketches;
determining a first log event associated with one or more of the plurality of log messages occurring with a first time interval, wherein the first log event comprises a first composition of message types corresponding to the one or more of the plurality of log messages associated with the first log event;
determining an event type for the first log event based on a comparison of the first composition of message types to a plurality of compositions of message types stored in the index; and
determining an anomalous log event within the plurality of log messages based on the event type for the first log event.

11. The non-transitory computer-readable storage medium of claim 10, wherein the fingerprint function comprises a hash function and the fingerprint values comprise integers generated by the hash function.

12. The non-transitory computer-readable storage medium of claim 10, wherein log events of a same event type have similar compositions of message types.

13. The non-transitory computer-readable storage medium of claim 10, wherein the determining the event type for the first log event comprises:
upon determining the first composition of message types is similar to at least one of the plurality of compositions of message types, assigning the event type to be a same event type corresponding to the similar composition of message types.

14. The non-transitory computer-readable storage medium of claim 10, wherein the determining the event type of the first log event comprises:
upon determining the first composition of message types is not similar to any of the plurality of compositions of message types, assigning a new event type for the first log event and inserting the first composition of message types into the index.

15. The non-transitory computer-readable storage medium of claim 10, wherein the first composition of message types for the first log event comprises a list of pairs of a message type identifier and corresponding frequency of occurrence.

16. The non-transitory computer-readable storage medium of claim 15,
wherein the index comprises a plurality of hash tables configured to map compositions of message types to event types; and
wherein the determining the event type of the first log event comprises performing lookups in the plurality of hash tables according to each pair of message type identifier and corresponding frequency of occurrence.

17. The non-transitory computer-readable storage medium of claim 10, wherein the determining the anomalous log event within the plurality of log messages further comprises:
determining the anomalous log event that differs in composition of message types based on the event type for the first log event.

18. The non-transitory computer-readable storage medium of claim 10, wherein the determining the anomalous log event within the plurality of log messages further comprises:
determining the anomalous log event based on the event type for the first log event and further based on frequency of occurrence over time.

19. A computer system for providing real-time analysis of log messages for a computer infrastructure, the computer system comprising: a system memory; a storage device having (i) a plurality of log messages including a first log message and (ii) an index having a plurality of sketches and compositions of message types; and a processor programmed to carry out the steps of:
generating a sketch associated with the first log message, wherein the sketch includes a tuple of fingerprint values generated by processing a subset of words of the first log message through a fingerprint function;
determining a message type for the first log message based on a comparison of the generated sketch to a plurality of sketches stored in the index, wherein log messages of a same message type have similar sketches;
determining a first log event associated with one or more of the plurality of log messages occurring with a first time interval, wherein the first log event comprises a first composition of message types corresponding to the one or more of the plurality of log messages associated with the first log event;

determining an event type for the first log event based on a comparison of the first composition of message types to a plurality of compositions of message types stored in the index; and determining an anomalous log event within the plurality of log messages based on the event type for the first log event.

20. The computer system of claim 19, wherein the processor programmed to carry out the step of determining the event type for the first log event is further programmed to carry out the steps of:

upon determining the first composition of message types is similar to at least one of the plurality of compositions of message types, assigning the event type to be a same event type corresponding to the similar composition of message types.

* * * * *